United States Patent
Benton

(10) Patent No.: US 7,407,008 B2
(45) Date of Patent: Aug. 5, 2008

(54) WEIGHTED ZERO SOLIDS LOSS CIRCULATION, FLUID LOSS AND INSULATING ANNULAR SPACE FLUID SYSTEMS

(75) Inventor: William J. Benton, Magnolia, TX (US)

(73) Assignee: Cabot Specialty Fluids, Inc., The Woodlands, TX (US)

( * ) Notice: Subject to any disclaimer, the term of this patent is extended or adjusted under 35 U.S.C. 154(b) by 171 days.

(21) Appl. No.: 11/431,205

(22) Filed: May 10, 2006

(65) Prior Publication Data

US 2007/0261848 A1    Nov. 15, 2007

(51) Int. Cl.
*C09K 8/506* (2006.01)
*C09K 8/508* (2006.01)
*C09K 8/512* (2006.01)

(52) U.S. Cl. .................. 166/288; 166/293; 166/300; 166/302

(58) Field of Classification Search ................ None
See application file for complete search history.

(56) References Cited

U.S. PATENT DOCUMENTS

| | | | |
|---|---|---|---|
| 4,498,995 A | 2/1985 | Gockel | |
| 4,643,255 A | 2/1987 | Sandiford et al. | |
| 5,358,051 A | 10/1994 | Rodrigues | |
| 6,016,879 A | 1/2000 | Burts, Jr. | |
| 6,790,812 B2 | 9/2004 | Halliday et al. | |
| 6,818,595 B2 | 11/2004 | Benton et al. | |
| 6,976,537 B1 | 12/2005 | Verret et al. | |
| 2002/0117457 A1 | 8/2002 | Benton et al. | |
| 2004/0035580 A1 | 2/2004 | Bouwmeester et al. | |
| 2005/0101490 A1* | 5/2005 | Vollmer | 507/100 |
| 2005/0107264 A1 | 5/2005 | van Batenburg et al. | |
| 2005/0274523 A1* | 12/2005 | Brannon et al. | 166/308.3 |
| 2006/0234871 A1 | 10/2006 | Dalrymple et al. | |

OTHER PUBLICATIONS

International Search Report from International Patent Application No. PCT/US2007/011173, mailed Oct. 25, 2007, three pages.
Written Opinion of the International Searching Authority for International Application No. PCT/US2007/011173, dated Oct. 25, 2007 (8 pages).

* cited by examiner

*Primary Examiner*—Zakiya W. Bates

(57) ABSTRACT

Loss circulation fluids contain aqueous based compositions having at least one alkali metal formate and at least one thermally activated self-crosslinkable gel forming material, wherein the composition is easily transported to a loss circulation zone and yet has ability to close off the loss circulation zone once thermally activated to reduce the loss of circulation fluids into flow passages of a subterranean formation. In addition, packer fluids contain aqueous based compositions which contain at least one alkali metal formate and at least one thermally activated self-crosslinkable gel forming material, wherein the packer fluid forms a thermal insulating fully hydrated gel once thermally activated.

30 Claims, 1 Drawing Sheet

WEIGHTED ZERO SOLIDS LOSS CIRCULATION, FLUID LOSS AND INSULATING ANNULAR SPACE FLUID SYSTEMS

BACKGROUND OF THE INVENTION

The present invention relates to weighted zero solids loss circulation and/or fluid loss systems, such as for the drilling industry, like oil field drilling and completion operations.

In one or more embodiments, the present invention relates to loss circulation fluids or loss circulation drilling fluids, and methods to control loss circulation fluids.

In the drilling of well bores with modern rotary well drilling apparatus and methods, the bore hole is normally kept filled with clean circulating drilling mud, or other drilling fluid, which washes and flushes the cuttings removed by the rotary bit from the bottom of the well bore. Drilling muds, or other drilling fluids, are pumped under pressure down the interior of the drill pipe and are forced out through openings in the drill bit, providing lubrication and wetting of the exposed surface, which increases the efficiency of the bit. The fluid then lifts the rock cuttings produced by the bit away from it and carries them up the annulus outside the string of drill pipe.

As the drilling mud, or other drilling fluid, passes up the annulus, it deposits a film or cake on the walls of the surrounding formation. This film or cake serves to seal small cracks or fissures, circa. 0.001-0.002" size, in the formation and also decreases friction on the rotating string of drill pipe. The rock cuttings which are carried to the surface by the drilling mud, or other drilling fluid, are removed from the mud, or other drilling fluid, by various types of separators, e.g. shaker screens, centrifugal filtering systems, desilters, etc. The cleaned drilling mud, or other drilling fluid, is then recirculated.

Conventional drilling muds, or other drilling fluids, are of varied composition, depending upon the needs of the particular drilling operation. While most drilling muds are mixtures of fresh water with various clays, such as expansible bentonite clay, native clay and attapulgite clay, such muds may contain salt water, oil, oil emulsions, synthetic materials, such as polymeric additives, or combinations of such materials. The term "drilling mud", as used herein, includes conventional drilling muds, and equivalent drilling fluids of the slurry type, such as cement slurries.

Additional components are often added to drilling muds to impart desired characteristics, such as added weight or increased viscosity. These components may function physically, as in the case of barite, which is added to increase weight; or chemically, as in the case of sulfuric acid or hydrofluoric acid as a deflocculent. The more complex drilling muds can be very costly and their loss can mean a substantial increase in the cost of drilling a well.

The particle size in common drilling muds can be from about 0.5 to 30 microns, with a small percentage (perhaps as much as 5%) of the particles being as large as 100 microns. The balance of the particles above this range can be removed in process of preparation and in separation of the rock cuttings prior to recirculation of the mud. Because of the constant cleaning and removal of larger particles, the drilling mud can bridge only very small fissures (less than 0.002 in.) within the formations as the muds are normally used.

When the formation penetrated by the well bore has openings or fissures larger than about 0.001-0.002", the ordinary drilling muds will flow into the openings and escape from the well bore into the formation. This loss of drilling mud may be slow or rapid depending upon the degree of porosity or the size of the fissures or fractures in the formation. In more severe cases the loss of fluid may result in a drop in the hydrostatic head to the point of hydraulic pressure equalization, which may fall thousands of feet below the surface.

In this instance, several conditions may occur which endanger the drilling operation and result in considerable economic loss. In normal circumstances, the column of drilling mud assists in supporting the wall of the well bore. Therefore, when a well bore is partially or completely emptied of drilling mud, the well bore walls are deprived of the hydraulic pressure head of the column of drilling circulation fluid extending downward from the surface, and consequently there will be hundreds or even thousands of feet of unsupported well wall that will be free to slough off and to cave into the well bore. That sloughing off or caving in may stick or freeze drill pipe that may be in the well bore or casing that may be therein and which is in the process of being installed and cemented. This condition is at times so severe that wells have been abandoned, or must be redrilled, because of it.

Additionally, the drilling mud is weighted to accommodate the depth of hole which has been drilled. This is done to minimize the danger of unequal pressures allowing a formation to release a bubble of gas, or a surge of oil or water toward the surface, causing a blowout of the well.

When drilling mud is lost in a well bore, the formation penetrated may be under great pressure which, if sufficient to overcome the static head of drilling mud remaining in the well bore, will cause a blowout, endangering the well, the financial investment in it, and the lives and safety of the personnel on site.

Where casing is being installed and cemented in place or cement plugs are being installed or other cementing operations are taking place, Portland cement slurries are often employed and these slurries likewise become lost through porous or fractured formations penetrated by the well bore.

As oil and gas wells are being drilled to progressively greater depths in the earth the problem of preventing or curing lost circulation becomes increasingly difficult largely due to the high differential in pressures encountered in the formations penetrated by deep well bores.

Where the well bore has penetrated depleted porous oil and gas formations and the pressures therein have become largely exhausted, the differential pressures may be 10,000 p.s.i. on the borehole side, forcing the drilling mud or cement slurries into the porous formations.

Lost circulation of drilling fluids has been a problem since the earliest days of well drilling. Many methods have been tried to solve the problem and many materials have been used as additives for preventing lost circulation.

There are a variety of lost circulation additives which are used. In particular, lost circulation additives can be flakes, fibers, and granular.

Drilling fluids are formulated to intentionally seal porous formations during drilling in order to stabilize the borehole and to control fluid loss. However, formations are frequently encountered that are so porous as to increase the loss of drilling fluids beyond an acceptable limit despite the use of lost circulation additives. Furthermore, a borehole may penetrate a fracture in the formation through which most of the drilling fluid may be lost.

In order to close off large pores and fractures that drain drilling fluid from the borehole, it is necessary to place the loss circulation material at the proper location and to be able to clean up the well bore after treatment is completed. The present invention offers a method for accomplishing this in a borehole whether the well is being drilled with aqueous drilling fluids, oil based drilling fluids or synthetic based drilling fluids.

A disadvantage with many previous loss circulation fluids and drilling fluids is that they contain a large amount of solids (e.g., barite, hematite or ilmenite) from the various components present, such as the weighting materials or other materials used to plug the lost circulation zones, such as ground nut shells, ground fibrous materials or ground plastics such as polyethylene.

Thus, there is a need to provide drilling fluids, completion fluids, and loss circulation fluids that can be preferably solids-free or have low solids content in the drilling fluid in order to avoid or minimize one or more of the above-mentioned disadvantages.

There is also a need to insulate the annular space of a producing wellbore, after drilling and completion operations are conducted, with a fluid that can retain the heat up the production string to minimize the deposition of waxes or the formation of hydrates, and the like.

It is often desirable that this annular space fluid or packer fluid acts to insulate the production fluid from cooling too rapidly. This acts to prevent the production fluid from waxing out and depositing on a colder and higher section of the production tubing as the producing oil or condensate hydrocarbon falls below its cloud point and waxes out.

By reducing the viscosity of an annular space or packer fluid by increasing the viscosity increasing components such as polymers, or preferably enabling cessation of viscosity flow as with a gel structure, the thermal convection is also being reduced and thermal conduction can increase thereby enhancing the insulating properties of the annular space.

SUMMARY OF THE PRESENT INVENTION

A feature of the present invention is to provide loss circulation fluids which can be solids-free or contain low amounts of solids in the loss circulation fluids.

Another feature of the present invention is to provide a loss circulation fluid which is easily transported to the loss circulation zone and yet has the ability to close off the loss circulation zone and plug fissures and thief zones once activated.

A further feature of the present invention is to provide loss circulation fluids which can have a variety of different densities in order to be useful in a variety of loss circulation situations depending upon the drilling depth and/or other variables.

An additional feature of the present invention is to provide a more environmentally friendly loss circulation fluid that can be aqueous based or polar. Saturated formate fluids, which are predominantely the carboxylic salts, can be considered aqueous based fluids, but can be considered polar fluids which contain amounts of water.

A further feature of the present invention is to provide a loss circulation fluid that is capable of plugging or closing off a loss circulation zone even at high temperatures.

An additional feature of the present invention is to provide a packer fluid having excellent thermal insulation properties that can be applied as an insulating packer fluid.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a loss circulation fluid comprising an aqueous based composition. The aqueous based composition comprises at least one alkali metal formate and at least one thermally activated self-crosslinkable gel forming material. The loss circulation fluid can optionally contain an acid(s) or base(s), such as an encapsulated acid(s) or encapsulated base(s).

The present invention further relates to a method for reducing the loss of circulation fluids into flow passages of a subterranean formation during a well drilling, completion, or workover operation. The process can involve stopping the injection of the circulation fluid into the well bore and then introducing into the flow passages an effective amount of the loss circulation fluid of the present invention. The process can further include the thermal activation of the self-crosslinkable gel forming material in the loss circulation fluid to form a gel in the flow passages to reduce the loss of circulation fluid upon resuming well drilling, completion, or workover operations.

The present invention further relates to a packer fluid comprising an aqueous based composition, wherein the composition comprises at least one alkali metal formate and at least one thermally activated self-crosslinkable gel forming material. The packer fluid can further optionally include at least one aerogel to provide or enhance thermal insulating properties of the packer fluid.

It is to be understood that both the foregoing general description and the following detailed description are exemplary and explanatory only and are intended to provide a further explanation of the present invention, as claimed.

The accompanying drawing, which is incorporated in and constitute a part of this application, illustrates some of the embodiments of the present invention and together with the description, serves to explain the principles of the present invention.

DETAILED DESCRIPTION OF THE PRESENT INVENTION

Figure 1:
FIG. 1 are photographs of jars containing the loss completion fluid of the present invention.

A problem which sometimes occurs in the oil field is the loss of circulation fluids such as drilling, completion and workover fluids into the subterranean formation. Loss of circulation fluids into the formation can cause damage to the drill bit caused by overheating and can result in a large decrease in drilling rate. This can cause large increases in the cost of drilling, collapse of the formation at the wellbore which can damage the wellbore beyond repair, or in-depth plugging of the formation which can damage the reservoir to such an extent that the reservoir may have to be abandoned.

In order to stop or retard the loss of circulation fluids into the reservoir it is desirable to plug the flow passages responsible for such losses very quickly. Cements and silicates have been used. However, because of the flow properties of cement and silicates, effective plugging is not always achieved. The large particles in cement prevent it from penetrating much beyond 8 centimeters (8 cm) into the low flow rate channels. Whereas in high flow rate channels the cement often does not stop the loss of circulation fluids probably because the cement did not set, which could be because of dilution due to formation water infusion or merely because the fast flow rate prevented setting. Cement plugs near the wellbore are frequently short circuited by the circulation fluid shortly after the resumption of drilling, completion, or workover operation. Thus, there is a need for a system that will plug both low flow and high flow rate channels adjacent a wellbore and not allow circulation fluids to pass.

The present invention relates to loss circulation fluids for use in drilling operations. For instance, the drilling operations can be a drilling of a well for hydrocarbon recovery, such as oil and/or gas. The loss circulation fluids of the present invention can also be used in other drilling or recovery operations where drilling fluids are used.

The loss circulation fluid of the present invention is an aqueous-based composition, which can also be considered a polar fluid. The aqueous-based loss circulation fluid contains at least one alkali metal formate and at least one thermally activated self-crosslinkable gel forming material. As an option, the loss circulation fluid of the present invention can contain an emulsion of the aqueous-based composition or solution with a hydrocarbon-based fluid for purposes of forming the loss circulation fluid. When a hydrocarbon-based fluid is present in the emulsion, preferably, at least one surfactant is present along with at least one hydrocarbon-based fluid.

With respect to the loss circulation fluid, the alkali metal formates are commercially available. For instance, the cesium formate can be obtained from Cabot Corporation. The cesium formate can be made, for instance, by following the description as set forth in International Published Patent Application No. WO 96/31435, incorporated in its entirety by reference herein. The alkali metal formate like cesium formate that is present in the composition, preferably as a soluble salt, as stated above, can be present in any concentration and the alkali metal formate solution like cesium formate solution is a liquid at room temperature. Therefore, the concentration of the alkali metal formate like cesium formate in the composition can be from about 1% to about 100% by weight and more preferably is present in an amount of from about 40% to about 95% by weight and even more preferably is present in the composition at a range of from about 55% to about 85% by weight or is present in the composition at a range of from about 70% to about 85% by weight. Besides the gel forming material(s), the remainder of the composition can be water and/or other aqueous solutions. Other conventional ingredients used in well drilling compositions can be used with the compositions of the present invention. Conventional ingredients used in drilling and/or completion fluids can also be used in the fluids of the present invention.

The pH of the alkali metal formate, such as cesium formate, that is present in the composition can be any pH. Preferably, the pH of the alkali metal formate (e.g., cesium formate) is from about 5 to about 13, more preferably from about 7 to about 12, and most preferably from about 9 to about 11. The alkali metal formate (e.g., cesium formate) can have its pH adjusted to a higher pH such as with the use of sodium or potassium hydroxide (NaOH or KOH) or preferably by standard buffering techniques such as by addition of soluble sodium or potassium carbonate or soluble sodium or potassium bicarbonate or other buffering agents which are compatible with the cesium formate or other alkali metal formate(s).

Other alkali metal formates that can be used in the present invention besides cesium formate are potassium formate and/or sodium formate which are also commercially available. These alkali metal formates can also be prepared in a similar fashion as the cesium formate solution described above, and are also frequently obtained as by-products from ester hydrolysis.

The alkali metal formate (e.g., cesium formate, potassium formate, or sodium formate) that is present in the aqueous-based or polar-based composition is preferably present in an amount equivalent to the saturation of the alkali metal salt. The alkali metal formate (e.g., cesium formate, potassium formate or sodium formate) is preferably fully saturated in the aqueous-based solution which also permits the gel forming material (and any other optional ingredients) to solubilize in the solution along with the alkali metal formate. Examples of saturated formate fluids are:

| Na Formate | 45 wt % | 10.8 ppg and s.g. 1.3; |
| K Formate | 75 wt % | 13.1 ppg and s.g. 1.57; and |
| Cs Formate | 80 wt % | 19.2 ppg and s.g. 2.3. |

A less than fully saturated Na formate can have a s.g. of 1.0.

The alkali metal formate can be present in any amount depending on the desired density to be obtained through the use of one or a combination of alkali metal formates. From the standpoint of the amount present in the loss circulation fluid, for instance, from about 8 lbs. to about 20 lbs. of the alkali metal formate, can be present per gallon of loss circulation fluid (ppg), and more preferably from about 0.5 lbs/bbl to about 20 lbs/bbl of loss circulation fluid.

In one or more embodiments, the alkali metal formate can be present in any molar amount, but is preferably present in an amount of from about 3 M to about 12 M, and more preferably from about 5 M to about 7.5 M. Preferably, the pH of the overall aqueous-based composition can be from about 7 to about 12 and more preferably from about 9.5 to about 10.5.

Also, the density of the composition (e.g., loss circulation fluid or packer fluid) can be adjusted to any desired density. This can especially be done with the introduction of other alkali metal formates, such as potassium formate. As an example, when an aqueous-based composition contains cesium formate, the density can range from about 1.8 to about 2.3 sg. This density range can be adjusted with the introduction of potassium formate or sodium formate or both. For instance, when 0-100 wt % amount of potassium formate or sodium formate or cesium formate or any combination thereof is included in the aqueous-based composition, the density of the overall aqueous-based composition can range from about 1.0 to about 2.3. Thus, the density of the aqueous-based composition can essentially be "dialed-in" to meet the density needed for the composition to be introduced into the well bore at the appropriate depth. For lower density ranges, sodium formate can be added to the potassium formate, hence, "dialing-in" lower density loss circulation fluids. Thus, the loss circulation fluids of the present invention make it possible to achieve a variety of different densities and to minimize or completely eliminate the solid weighting material that is present in conventional loss circulation fluids.

Preferably, the loss circulation fluid contains cesium formate as the alkali metal formate. More preferably, the loss circulation fluid contains two or more alkali metal formates, wherein preferably one of the alkali metal formates is cesium formate. A preferred combination of formates includes, but is not limited to, cesium formate with potassium formate. Other combinations of alkali metal formates can be used, such as sodium formate and potassium formate or sodium formate and cesium formate. Essentially, any combination of one or more monovalent carboxylic salts can be used for purposes of the loss circulation fluids of the present invention. Examples of suitable ratios of two or more alkali metal formates are 2-4 parts cesium formate to 0.1 to 4 parts of a second alkali metal formate, like sodium formate or potassium formate, wherein the parts are by weight.

Preferably, with respect to the loss circulation fluid of the present invention, at least 35% by volume of the fluid in the loss circulation fluid is an aqueous-based solution containing at least one alkali metal formate. More preferably, at least 50% by volume of the fluids present in the loss circulation fluid is an aqueous-based solution containing at least one alkali metal formate and even more preferably at least 75% by volume of the fluids present in the loss circulation fluid of the present invention is an aqueous-based solution containing at least one alkali metal formate. Most preferably, at least 90% by volume of the fluids present in the loss circulation fluid of the present invention is an aqueous-based solution containing at least one alkali metal formate. In another embodiment, at least 95% or more by volume of the fluids of the present invention contain an aqueous-based solution containing at least one alkali metal formate. In one embodiment, all of the fluids present are an aqueous-based solution containing at least one alkali metal formate wherein essentially no hydrocarbon or oil (e.g., less than 1% by weight or 0% by weight) is present in the loss circulation fluid. Since the alkali metal formate is preferably dissolved in the aqueous solution, the loss circulation fluid can be completely solids free since the alkali metal formate preferably acts as a lubricant and a weighting material.

With respect to the thermally activated self-crosslinkable gel forming material present in the loss circulation fluid of the present invention, this gel is self-crosslinkable, meaning no catalyst, crosslinking agent, or other component is necessary in order for it to crosslink. Furthermore, this gel forms and preferably crosslinks at high temperature. However, at ambient temperature (e.g., 35° F. to 95° F.), it does not form a gel and is simply a fluid having a viscosity slightly higher than the alkali metal formate solution. In particular, as a pre-gel, the self-crosslinkable gel forming material can have a viscosity of from about 5 cps to about 200 cps and it can easily be blended with the alkali metal formate solution. The gel forming material is capable of self-crosslinking and forming a gel at a temperature of approximately 100° F. or more. At temperatures below about 100° F., the material does not gel in a short period of time after mixing even though it disperses into the formate brine. Preferably, the gel forming material can form a gel at temperatures of from about 100° F. to about 400° F., or from about 125° F. to about 375° F., and more preferably from about 150° F. to about 350° F. At this temperature range, the gel forming material is thermally or heat activated and crosslinks to form a crosslinked gel which causes the entire loss circulation fluid to gel. This effect is shown in FIG. 1, wherein a solids-free loss circulation fluid containing cesium-potassium formate and a thermally activated self-crosslinkable gel forming material are present in a polar-based composition. Upon being subjected to a temperature of 200° F. and within one hour, it is clear how the loss circulation fluid forms a complete gel which resists the effects of gravity and is stable for over 10 days at the gelling temperature. The loss circulation fluid can be activated to form a complete gel or partial gel by heat activation as described above. At certain depths in the well bore, this temperature is inherently present and, therefore, the loss circulation fluid will be heat activated to form a gel due to the temperatures in the well bore at the various locations. The term "gel," in one or more embodiments, is meant to refer to a chemically crosslinked 3-dimensional elastic network of long-chain molecules with a certain amount of immobilized molecules.

Examples of suitable thermally activated self-crosslinkable gel forming materials include, but are not limited to, carboxymethyl guar (CMG) or carboxymethyl tamarind (CMT) gums. The gel forming material can be present in any amount sufficient to cause the loss circulation fluid to have significantly higher viscosity upon gelling and, more preferably, an amount that will cause the entire loss circulation fluid to gel or at least partially gel. For instance, the concentration of the gel forming material present in the loss circulation fluid can be an amount from about 0.1 lb. to about 15 lbs. per barrel (lbs/bbl) wherein an oilfield barrel is 42 gallons. The gel forming material can be a solid or liquid. If a solid, the solid (e.g., powder) can be dispersed or dissolved in the loss circulation fluid, or can be dispersed or dissolved in a separate fluid, like water or a formate solution, and then added to the loss circulation fluid.

The gel forming material preferably has a pH which makes it compatible with the alkali metal formate solution in the aqueous-based composition of the loss circulation fluid.

In particular, the CMG and CMT can be a powder that can be dispersed directly into a formate solution. On the other hand, one can pre-formulate a slurry of the gel material with either water or a formate that would eliminate any dust requirement for example.

The gel forming material can be blended with the alkali metal formate solution using conventional techniques for blending two materials together. For instance, the materials can simply be added together and subjected to mechanical stirring or mixing.

The loss circulation fluids of the present invention can be introduced into the well bore by any conventional technique such as, but not limited to, being pumped into the drill pipe. Further, the loss circulation fluids can be recovered using conventional techniques.

The loss circulation fluids of the present invention can be prepared by mixing all of the components together. When an emulsion is prepared, typically, the components will be mixed together such as by shearing in order to ensure a dispersion that is preferably uniform with respect to the components.

With respect to the loss circulation fluid, this fluid at temperatures below the thermal activation has a low viscosity which permits the loss circulation fluid to be easily pumped down the well bore and placed at a location where loss circulation is occurring. One advantage of the loss circulation fluid of the present invention is that this loss circulation fluid can have the same or similar density and other physical parameters as the drilling fluid itself and, therefore, is very compatible with drilling fluids, such as alkali metal formate drilling fluids as described in U.S. Patent Application Publication No. 2002/0117457 and U.S. Pat. No. 6,818,595 B2, both incorporated in their entirety by reference herein. A further advantage of the present invention is that, in preferred embodiments, the loss circulation fluid has zero solids present in the loss circulation fluid, which makes the loss circulation fluid easy to pump or inject into a well and placed at the location where loss circulation is occurring. In addition, since, in preferred embodiments, no solids are present, this loss circulation fluid can easily, if desired, enter fissures and thief zones to effectively close off the loss circulation zone upon the gelling of the loss circulation fluid. It is noted that in wells typically deeper or below 8000 feet, temperatures are significantly higher than 100° F. and, therefore, the loss circulation fluids are quite effective at certain well depths which require thermal stability and which require a loss circulation fluid that can easily be injected to this depth level in an easy fashion and yet act as a suitable loss circulation fluid once it is placed at its desired location. Thus, the present invention provides advantages from the standpoint of being easy to deliver to the loss circulation zone and yet acting as a suitable loss circulation fluid upon gelling. In the alternative, as part of the present invention, upon the loss circulation fluid being introduced or injected into the well and placed at the location where loss circulation is occurring, and upon thermal activation and gelling, the gelled loss circulation fluid can be broken down by the introduction of an acid, such as a weak or strong acid or a strong base (e.g., pH 9 or higher, such as pH 10-14, or pH 11-14, or pH 12-14). This acid or base can be introduced many ways in the form of a solid (e.g., powder), liquid, or gas. The acid or base can be pumped or injected to the desired location by itself as a solid, liquid, or gas, or can be with other ingredients, such as a fluid, like a drilling fluid. For instance, an aqueous solution containing the acid or base can simply be introduced into the well bore, preferably at the location where the loss circulation fluid is located. The acid or base can be introduced in the form of a drilling fluid containing the acid or base, such as alkali metal formate containing drilling fluids, for instance, as set forth in U.S. Pat. No. 6,818,595. Again, introduction of the acid or base using a fluid having similar or the same densities and other characteristics as the loss circulation fluid can be quite advantageous from the standpoint of ease of delivery and from the standpoint of the fluid having a proper density so that it remains at the site of the loss circulation fluid. The acid or base used in this embodiment can be the same acid or base used in the embodiment involving the encapsulated acid or base, except that typically when an acid or base is used in this manner, the acid or base will be dissolved in an aqueous-based solution. The concentrations can be the same as described above.

In one or more embodiments of the present invention, one or more acids (or bases) or an acid (or base) and an ester can be formulated and introduced into the well bore at the location where the loss circulation fluid has gelled in order to break the gel structure. For instance, blends of a formic and/or citric ester along with an acid, such as citric acid (or a strong base like NaOH, e.g., at pH of 9 or above), can be formulated together and introduced into the well bore and within a short period of time, for instance, less than an hour at 200° F. with a 100 psi back pressure, the gel structure of the gelled loss circulation fluid can be broken down. As an option, the loss circulation fluid can contain an encapsulated acid or base. The encapsulated acid or base can have time-releasable properties. In more detail, in certain situations, it is desirable to break the gel structure and remove or dissolve (at least partially) the loss circulation fluid once the well is completed and hydrocarbon recovery is under way. A preferred method of breaking the gel structure of the loss circulation fluid of the present invention is with the use of an acid or base (e.g., a breaker material comprising at least one acid or base, having a sufficient pH to break/dissolve the gel) which is preferably compatible with the alkali metal formate present. Suitable acids include, but are not limited to, formic acid, acetic acid, citric acid, combinations thereof, and the like. Preferably, the acid is a weak acid, meaning that it is has a pH of from about 3.75 to about 6.75 and more preferably from about 5 to about 6. Blends of two or more acids can be used. In one embodiment of the invention, preferably, the acid, when used in encapsulated form, is a solid which permits the encapsulation of the acid in solid form (e.g., particles). The base is preferably a strong base, like a pH of 9 or higher as described earlier and can be in any form, such as a solid, especially when used for encapsulation. The acid or base can be fully encapsulated with a material that eventually breaks down and thus permits the acid or base to contact the remaining components of the loss circulation fluid such that it breaks the gel structure of the loss circulation fluid and thereby making the loss circulation fluid removable from the well bore and, in particular, the loss circulation zone where it was placed. Depending upon the coating on the acid or base and the type of encapsulation material used, the time-release of the acid or base to break the gel structure can occur on the order of 1 hour to multiple weeks, such as within one week, two weeks, three weeks, four weeks, or five weeks, such as from within one week to eight weeks or more. Preferably, the amount of acid or base present in encapsulated form is an amount sufficient to break the gel structure. For instance, the amount of acid is from about 0.5 to about 50 parts of the acid such as citric acid per 100 parts of gel structure, based on weight. The base can be used in similar amounts.

Generally, the compositions of the present invention can be introduced into the well by a coil tubing which fits inside the production tubing of a well. This coil tubing can be inserted such that it can reach any point of the well and preferably reaches to the bottom of the well where the compositions of the present invention can be pumped and/or jetted, also known as bullheading, into the well bore. The density of the compositions of the present invention should be such that the composition remains at the location where it was introduced, if desired. With the proper density, the oil or other hydrocarbons being recovered can displace the gel remnants after the acid has opened up productivity from the formation face. Over time, the rate of the dissolution of the compositions of the present invention will decrease by being contacted with the oil and any other water being released during recovery of the hydrocarbons. This will eventually dilute the compositions such that the composition is eventually pumped to the surface along with the recovery of hydrocarbons to the surface. Once recovered at the surface, the composition of the present invention will separate from the hydrocarbon, such as oil, by the separation of water/oil phases. Accordingly, the recovery of hydrocarbons is not affected by the use of the composition of the present invention, and is quite easily separated as well.

As an additional embodiment of the present invention, the present invention relates to a fluid loss spotting pill containing the loss circulation fluid of the present invention. In another embodiment of the present invention, the present invention involves a slug containing the loss circulation fluid of the present invention. As with the loss circulation fluid, the fluid loss spotting pill or slug in one or more embodiments requires no carrier fluid since, in preferred embodiments, there is substantially no or completely no solids present in the loss circulation fluid of the present invention. Furthermore, in the present invention, the loss circulation fluid and the manner of delivery involves a one part system. In other words, there is no two or multiple part systems required to activate the loss circulation fluid or to cause it to gel. In the present invention, as described above, the high temperatures in the well bore will thermally activate the gel causing the gelling of the gel forming material.

Thus, the spotting pill can be injected into the loss zone to form a substantially or completely impermeable filter cake to seal pores or fractures in the loss zone. As an option, once the filter cake is thoroughly set and loss has stopped, the filter cake can be later remediated by exposure to an acid solution (or base solution), as discussed above, which breaks the gel apart and allows a free-flowing reservoir for hydrocarbon production. The loss circulation fluid or spotting pill can be used in both producing and non-producing intervals of the well bore.

While preferred embodiments of the present invention involve zero solids in the loss circulation fluid, as an option, the loss circulation fluid can have a solid content of, for instance, up to 50 lbs per bbl, or preferably from about 10 lbs per bbl to about 35 lbs per bbl. The solids can have a particle size distribution that will optimally bridge the pores or fractures of the formation. One example of a suitable solid is calcium carbonate. Other conventional solids used in the drilling fluid industry can be used.

As an alternative, the loss circulation fluids of the present invention can be heat activated to form a gel by applying an outside source of heat. For instance, the loss circulation fluid can be pumped to the desired location in the well bore and then afterwards, a solution having a temperature in the activation range or even higher can be pumped to the same location in order to thermally activate the loss circulation fluid. This additional fluid that can follow the pumping of the loss circulation fluid can be a standard alkali metal formate drilling fluid as described in U.S. Pat. No. 6,818,595, which is incorporated in its entirety by reference herein. This type of drilling fluid or other conventional drilling fluids can be applied as a hot fluid having the desired temperature, such as from 100° F. to 450° F. or from 170° F. to 500° F. or from about 200° F. to about 400° F. Other means to thermally activate the loss circulation fluid can be used in combination with or as an alternative to thermal activation from a sufficient well bore temperature. For instance, thermal activation can occur from contacting the loss circulation fluid with a solid, liquid, and/or gas (e.g., steam) having sufficient temperature to cause thermal activation of the loss circulation fluid.

In another embodiment of the present invention, the present invention relates to a packer fluid comprising a fully hydrated gel of the present invention. For instance, the packer fluid can be introduced in the annulus of the well bore in order to insulate the well bore (or a portion thereof) from low temperatures. The packer fluid can be introduced in a pre-gel state, like the loss circulation fluid of the present invention. The packer fluid comprises an aqueous-based composition, wherein the composition comprises at least one alkali metal formate and at least one thermally activated self-crosslinkable gel forming material. The details of each of these components are the same as set forth above with respect to the loss circulation fluid of the present invention. The packer fluid, upon being introduced into the annulus of the well bore, will become thermally activated to form a gel and thereby result in a fully hydrated gel which has excellent thermal properties. As stated above, external means can be used to activate the fluid (e.g., adding hot fluid, blow hot gas, etc.). Thus, the present invention relates to an insulating packer fluid. The thermal insulating properties of the packer fluid can be even further enhanced by the addition of a thermal insulating material, like an aerogel. The aerogel can be aerogel from Cabot Corporation. The amount of the aerogel can be an amount sufficient to enhance the overall thermal insulating properties of the packer fluid. For instance, the aerogel can be present in an amount of from about 1.0 to about 30 vol % of packer fluid. The packer fluid of the present invention, upon gelling, has desirable insulation properties, and permits the well bore to be thermally insulated and thereby can permit an increased flow of hydrocarbons from the well bore during the recovery operations.

The present invention will be further clarified by the following examples, which are intended to be exemplary of the present invention.

EXAMPLES

Example 1

In the following example, a loss circulation fluid was prepared by taking a 15.8 lb. per barrel of a blend of cesium formate and potassium formate buffered pH of 10.02. In particular, the cesium formate was present in an amount of 48 wt % of a 2.2. s.g. cesium formate solution and the potassium formate was present in an amount of 52 wt % of a 1.57 s.g. potassium formate. In this example, 2 lbs. per barrel, or 5 lbs. per barrel, or 8 lbs. per barrel of carboxymethyl guar was present in the loss circulation fluid. The material was subjected to a standard Fann 35 viscometer test to determine the rheological properties of the three fluids which involved subjecting the three loss circulation fluids to a rotating blank having standard readings taken at 600, 300, 200, 100, 6 and 3 rpm or a range of various settings to achieve a desired rpm as shown in the table below.

The table below represents the typical initial properties of an oilfield fluid system which is run on a Fann 35 viscometer at the various rpm. From this the PV—Plastic Viscosity in centipoises (cps) and YP—Yield Point in lbs/100 ft$^2$ are derived, as per American Petroleum Institute, API Recommended Practice 13D Third Edition, Jun. 1, 1995 "Recommended Practice on the Rheology and Hydraulics of Oil-Well Drilling Fluids". The gel strengths are also in lbs/100 ft$^2$. For a given pressure, the fluid increases in viscosity with time and for a given temperature, demonstrating that the fluid continues to self-crosslink or gel.

TABLE 1

| | System RPM | | | | | | | | | |
|---|---|---|---|---|---|---|---|---|---|---|
| | 600 | 300 | 200 | 100 | 6 | 3 | 10 Sec. Gel | 10 Min. Gel | PV | YP |
| Buffered 15.8 ppg Cs/K Formate with 2.0 lbs/bbl LCM | 48 | 30 | 22 | 13 | 2 | 2 | 3 | 11 | 18 | 12 |
| Buffered 15.8 ppg Cs/K Formate with 5.0 lbs/bbl LCM | 90 | 57 | 44 | 27 | 4 | 3 | 8 | — | 33 | 24 |
| Buffered 15.8 ppg Cs/K Formate with 8.0 lbs/bbl LCM | 235 | 165 | 132 | 90 | 24 | 19 | 21 | 36 | 70 | 95 |

The gel fluid system is poured into a pre-heated HPHT filtration vessel which has an Aloxite disc (porous media of given average pore size) which is then sealed and a 100 psi pressure applied. The fluid sits in the vessel at temperature and pressure for a given residence time, which in the case of these tests, was one hour. Then the release valve is opened up and the amount of fluid that initially pours through, known as the spurt loss, is measured which is followed by incremental time for any following fluid loss, which in this case is about 4 mls over a three hour period which is typically considered very good. The cell was then re-opened and an acid was added of a given type and concentration. The cell was re-sealed and after a small residence time, the valve was re-opened and the amount of continued fluid loss was measured to gauge the effectiveness of the acid system. With a 50 wt % citric acid solution the fluid loss was complete immediately, i.e., the acid successfully broke the gel.

Example 2

A Fann 70 rheological profile on a sample of the fluid in Example 1 was conducted. The fluid was the buffered 15.8 ppg Cs/K Formate with 8.0 lbs/bbl LCM. The fluid was heated from 75° F. to 375° F. in 25° F. increments. At each temperature, the Fann 70 reading at 60 rpm and 6 rpm was taken. A second Fann 70 test was run to measure the increase in viscosity of the fluid while maintaining a constant temperature of 200° F. and pressure of 400 psi. This test was run for 19 hours.

The purpose of the first Fann 70 test was to determine at what temperature the fluid began to show an increase in viscosity. The test was continued to determine the maximum temperature that the fluid would withstand. The purpose of the second test was to determine if viscosity would increase with time while holding a constant temperature and pressure on the fluid.

First Fann 70 Test

The fluid showed a rise in 60 rpm and 6 rpm values between 150° F. and 175° F. The fluid continued to gain viscosity to 225° F., where it appeared to reach a plateau until 300° F. At 300° F., the fluid dramatically increased in viscosity to 350° F. When the temperature of the fluid increased from 350° F. to 375° F., the 60 rpm and 6 rpm Fann 70 values decreased to viscosity levels seen at 150° F. to 200° F. By allowing the fluid to cool by 50° F. (from 375° F. to 325° F.), the fluid regained most of its viscosity, to 60 rpm values seen at 300° F.

Second Fann 70 Test

Test results showed a very gradual increase in viscosity when the fluid was held at 200° F. for 19 hours.

Test Procedure

1. Fann 70 Testing, Test 1
   a) Run initial rheology at 75° F., 0 psi. Increase pressure to 400 psi and run rheology.
   b) While rotating at 60 rpm, increase temperature to 100° F. Adjust pressure to 400 psi. Measure 60 rpm and 6 rpm value. Maintain temperature for ten minutes, then rerun 60 and 6 rpm values.
   c) Continue b) above, increasing temperature by 25° F. increments.
   d) When maximum temperature has been reached, cool fluid by 50° F. and run 60 and 6 rpm Fann 70 readings.
   e) Plot out 60 rpm and 6 rpm Fann 70 readings vs. temperature.

2. Fann 70 Testing, Test 2
   a) Run initial rheology at 75° F., 0 psi. Increase pressure to 400 psi and run rheology.
   b) While rotating at 60 rpm, increase temperature to 200° F. Adjust pressure to 400 psi. Measure 200 rpm, 60 rpm and 6 rpm value.
   c) Continue b) above, increasing time between tests to one hour.
   d) Plot out 200 rpm, 60 rpm and 6 rpm Fann 70 readings vs. time.

TABLE 2

Fann 70 Properties of LCM Fluid

| Test Temperature, ° F.<br>Pressure, psi | 75° F.<br>0 | 75° F.<br>400 | Initial<br>100° F.<br>400 | 10 min.<br>100° F.<br>400 | Initial<br>125° F.<br>400 | 10 min.<br>125° F.<br>400 | Initial<br>150° F.<br>400 | 10 min.<br>150° F.<br>400 | Initial<br>175° F.<br>400 | 10 min.<br>175° F.<br>400 |
|---|---|---|---|---|---|---|---|---|---|---|
| 600 rpm | 45.6 | 49.8 | — | — | — | — | — | — | — | — |
| 300 rpm | 19.8 | 22.2 | — | — | — | — | — | — | — | — |
| 200 rpm | 12.5 | 14.9 | — | — | — | — | — | — | — | — |
| 100 rpm | 7.1 | 9.5 | — | — | — | — | — | — | — | — |
| 60 rpm | 5.8 | 7.3 | 4.4 | 4.4 | 2.4 | 2.4 | 2.4 | 3.4 | 10.7 | 15.2 |
| 30 rpm | 3.4 | 5.9 | — | — | — | — | — | — | — | — |
| 6 rpm | 1.4 | 2.9 | 0.7 | 0.7 | 0.7 | 0.7 | 0.7 | 0.7 | 2.4 | 7.6 |
| 3 rpm | 0.7 | 1.4 | — | — | — | — | — | — | — | — |
| Plastic Viscosity, cP | 25.8 | 27.6 | — | — | — | — | — | — | — | — |
| Yield Point, #/100 ft$^2$ | −6 | −5.4 | — | — | — | — | — | — | — | — |
| Gels, 10 sec/10 min. | 1.4/1.4 | 1.4/1.4 | — | — | — | — | — | — | — | — |

| Test Temperature, ° F.<br>Pressure, psi | Initial<br>200° F.<br>400 | 10 min.<br>200° F.<br>400 | 1 hr.<br>200° F.<br>400 | Initial<br>225° F.<br>400 | 10 min.<br>225° F.<br>400 | Initial<br>250° F.<br>400 | 10 min.<br>250° F.<br>400 | Initial<br>275° F.<br>400 | 10 min.<br>275° F.<br>400 |
|---|---|---|---|---|---|---|---|---|---|
| 600 rpm | — | — | 96.3 | — | — | — | — | — | — |
| 300 rpm | — | — | 70.0 | — | — | — | — | — | — |
| 200 rpm | — | — | 57.4 | — | — | — | — | — | — |
| 100 rpm | — | — | 44.6 | — | — | — | — | — | — |
| 60 rpm | 18.9 | 23.5 | 37.3 | 38.2 | 41.9 | 41.9 | 42.8 | 41.0 | 42.5 |
| 30 rpm | — | — | 30.8 | — | — | — | — | — | — |
| 6 rpm | 8.0 | 10.7 | 19.8 | 20.7 | 23.5 | 22.6 | 22.6 | 19.8 | 19.8 |
| 3 rpm | — | — | 16.1 | — | — | — | — | — | — |

TABLE 2-continued

| Fann 70 Properties of LCM Fluid | | | | | | | | | |
|---|---|---|---|---|---|---|---|---|---|
| Plastic Viscosity, cP | — | — | 26.3 | — | — | — | — | — | — |
| Yield Point, #/100 ft² | — | — | 43.7 | — | — | — | — | — | — |
| Gels, 10 sec/10 min. | — | — | — | — | — | — | — | — | — |

| | Initial | 10 min. | Initial | 10 min. | Initial | 10 min. | Initial | 10 min. | Cool to |
|---|---|---|---|---|---|---|---|---|---|
| Test Temperature, °F. | 300° F. | 300° F. | 325° F. | 325° F. | 350° F. | 350° F. | 375° F. | 375° F. | 325° F. |
| Pressure, psi | 400 | 400 | 400 | 400 | 400 | 400 | 400 | 400 | 400 |
| 600 rpm | — | — | — | 300+ | — | 300+ | — | 70.0 | 142.0 |
| 300 rpm | — | — | — | 300+ | — | 300+ | — | 37.3 | 98.1 |
| 200 rpm | — | — | — | 300+ | — | 240.5 | — | 27.2 | 80.9 |
| 100 rpm | — | — | — | 224.5 | — | 148 | — | 13.4 | 49.2 |
| 60 rpm | 44.6 | 45.6 | 87.2 | 134.1 | 110.3 | 110.3 | 18.0 | 9.8 | 41.0 |
| 30 rpm | — | — | — | 92.6 | — | 74.5 | — | 6.2 | 28.1 |
| 6 rpm | 19.8 | 19.8 | 34.5 | 44.6 | 39.1 | 27.2 | 2.4 | 1.4 | 11.6 |
| 3 rpm | — | — | — | 30.8 | — | 15.2 | — | 1.4 | 8.0 |
| Plastic Viscosity, cP | — | — | — | — | — | — | — | 32.7 | 43.9 |
| Yield Point, #/100 ft² | — | — | — | — | — | — | — | 4.6 | 54.2 |
| Gels, 10 sec/10 min. | — | — | — | — | — | — | — | — | — |

TABLE 3

| Fann 70 Test Results of 200, 60, and 6 rpm Values, 200° F., 400 psi, for 19 hours | | | | | | | | |
|---|---|---|---|---|---|---|---|---|
| Time, hrs | 0 | 0 | 0.5 | 1 | 2 | 3 | 4 | 5 |
| Test Temperature, °F. | 75° F. | 75° F. | 200° F. | 200° F. | 200° F. | 200° F. | 200° F. | 200° F. |
| Pressure, psi | 0 | 400 | 400 | 400 | 400 | 400 | 400 | 400 |
| 600 rpm | 47.2 | 53.9 | 66.9 | — | — | — | — | — |
| 300 rpm | 20.2 | 25.5 | 49.8 | — | — | — | — | — |
| 200 rpm | 13.8 | 18.1 | 40.6 | 44.2 | 54.8 | 59.7 | 61.5 | 63.3 |
| 100 rpm | 6.6 | 10.9 | 28.6 | — | — | — | — | — |
| 60 rpm | 4.8 | 8.7 | 23.6 | 26.8 | 36.9 | 40.6 | 42.4 | 42.4 |
| 30 rpm | 3.0 | 6.3 | 18.5 | — | — | — | — | — |
| 6 rpm | 1.0 | 2.9 | 10.4 | 13.1 | 19.4 | 21.3 | 21.3 | 21.3 |
| 3 rpm | 0.5 | 1.4 | 8.6 | — | — | — | — | — |
| Plastic Viscosity, cP | 27.0 | 28.4 | 17.1 | — | — | — | — | — |
| Yield Point, #/100 ft² | −6.8 | −2.9 | 32.7 | — | — | — | — | — |
| Gels, 10 sec/10 min. | 1.0/1.0 | 1.4/1.4 | 8.6/8.6 | — | — | — | — | — |

| Time, hrs | 6 | 7 | 8 | 9 | 17 | 18 | 19 |
|---|---|---|---|---|---|---|---|
| Test Temperature, °F. | 200° F. | 200° F. | 200° F. | 200° F. | 200° F. | 200° F. | 200° F. |
| Pressure, psi | 400 | 400 | 400 | 400 | 400 | 400 | 400 |
| 600 rpm | — | — | — | — | — | — | — |
| 300 rpm | — | — | — | — | — | — | — |
| 200 rpm | 64.2 | 65.1 | 66.0 | 66.9 | 77.8 | 79 | 80.5 |
| 100 rpm | — | — | — | — | — | — | — |
| 60 rpm | 43.3 | 44.3 | 45.2 | 45.2 | 52.5 | 53.4 | 54.3 |
| 30 rpm | — | — | — | — | — | — | — |
| 6 rpm | 22.2 | 23.1 | 24.0 | 24.0 | 26.8 | 26.8 | 26.8 |
| 3 rpm | — | — | — | — | — | — | — |

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A loss circulation fluid consisting essentially of an aqueous based composition, wherein said composition consists essentially of at least one alkali metal formate and at least one thermally activated self-crosslinkable gel forming material, wherein the composition being transportable to a loss circulation zone and adapted to close off the loss circulation zone once thermally activated.

2. The loss circulation fluid of claim 1, wherein said alkali metal formate comprises cesium formate.

3. The loss circulation fluid of claim 1, wherein said alkali metal formate comprises cesium formate and potassium formate.

4. The loss circulation fluid of claim 1, wherein said gel forming material is thermally activated to form a gel at a temperature of from about 120° F. to about 375° F.

5. The loss circulation fluid of claim 1, wherein said gel forming material is thermally activated to form a gel at a temperature of from about 175° F. to about 250° F.

6. The loss circulation fluid of claim 1, wherein said gel forming material is a carboxymethyl guar or a carboxymethyl tamarind gum or combinations thereof.

7. The loss circulation fluid of claim 1, wherein said gel forming material is present at a concentration of from about 0.1 lb. to about 15 lbs. per barrel of loss circulation fluid.

8. The loss circulation fluid of claim 1, wherein said alkali metal formate is present in an amount of from about 3 lbs. to about 10 lbs. per gallon of loss circulation fluid.

9. The loss circulation fluid of claim 1, further comprising at least one encapsulated acid.

10. The loss circulation fluid of claim 9, wherein said encapsulated acid contains an acid having an initial pH of from about 3.75 to about 6.75.

11. The loss circulation fluid of claim 9, wherein said encapsulated acid is an encapsulated formic acid, acetic acid, citric acid, or combinations thereof.

12. The loss circulation fluid of claim 1, further comprising at least one encapsulated base.

13. The loss circulation fluid of claim 12, wherein said encapsulated base contains a base having an initial pH of 9 or higher.

14. The loss circulation fluid of claim 1, having a solid content of up to 50 lbs per bbl.

15. The loss circulation fluid of claim 1, having a solid content of about 10 lbs per bbl to about 35 lbs per bbl.

16. The loss circulation fluid of claim 1, further having at least one time-releasable gel breaker material that is an encapsulated acid or an encapsulated base, wherein said at least one time-releasable gel breaker material is in solid particle form that breaks down.

17. The loss circulation fluid of claim 16, wherein the gel breaker material comprises coated acid or coated base in solid form that breaks down.

18. A method to reduce the loss of circulation fluids into flow passages of a subterranean formation into flow passages of a subterranean formation during a well drilling, completion, or workover operation, comprising introducing into the flow passages an effective amount of the loss circulation fluid of claim 1, subjecting the loss circulation fluid introduced into the flow passages to a temperature effective to thermally activate the loss circulation fluid wherein said loss circulation fluid forms a gel upon thermal activation within a period of time thereby reducing the loss of circulation fluid.

19. The method of claim 18, wherein thermal activation occurs from a sufficient well bore temperature.

20. The method of claim 18, wherein thermal activation occurs from contacting said loss circulation fluid with a solid, liquid, or gas having sufficient temperature to cause thermal activation of the loss circulation fluid.

21. The method of claim 18, further comprising contacting said gel with a breaker material comprising at least one acid or base having a sufficient pH to break said gel.

22. The method of claim 18, wherein said subjecting comprises contacting the loss circulation fluid with a solid, liquid, or gas at a sufficient temperature to cause thermal activation of the loss circulation fluid.

23. The method of claim 22, wherein said temperature is approximately 100° F. or more.

24. The method of claim 18, wherein said introducing comprises including at least one time-releasable gel breaker material that is an encapsulated acid or encapsulated base in the loss circulation fluid introduced into the flow passages, wherein said gel breaker material breaks down in a time-released manner to permit the encapsulated acid or base to contact and break said gel after formation of said gel.

25. The method of claim 24, wherein said loss circulation fluid contains the at least one time-releasable gel breaker material in solid form in an amount of about 0.5 to about 50 parts of acid or base per 100 parts of gel structure, based on weight, of the gelled loss circulation fluid.

26. The method of claim 24, wherein the gel breaks within one week to eight weeks.

27. The method of claim 18, further comprising, after formation of said gel, introducing a gel breaker material comprising at least one acid or base into the well at a location where the loss circulation fluid has gelled effective to contact and break said gel.

28. A packer fluid consisting essentially of an aqueous based composition, wherein said composition consists essentially of at least one alkali metal formate and at least one thermally activated self-crosslinkable gel forming material, wherein said packer fluid being adapted to form a thermal insulating hydrated gel once thermally activated.

29. The packer fluid of claim 15 further comprising at least one aerogel.

30. The packer fluid of claim 15, wherein said aerogel is present in an amount of from 0.1 to about 30 vol %.

* * * * *